United States Patent [19]
Charles et al.

[11] Patent Number: 5,941,963
[45] Date of Patent: Aug. 24, 1999

[54] SYSTEM AND METHOD FOR INTERCONNECTION OF COMPUTER PERIPHERALS VIA MULTIPLE INTERFACES

[75] Inventors: Paul Charles, 15345 Calle Enrique, Morgan Hills, Calif. 95037; Greg R. Le Veille, Monte Sereno, Calif.

[73] Assignee: Paul Charles, Scottsdale, Ariz.

[21] Appl. No.: 08/800,397

[22] Filed: Feb. 14, 1997

[51] Int. Cl.[6] .............................. G06F 13/00; G06F 13/14
[52] U.S. Cl. ................................. 710/62; 395/500; 710/2; 710/74
[58] Field of Search ..................................... 395/882, 500, 395/894; 364/221.1, 221.8

[56] References Cited

U.S. PATENT DOCUMENTS

| 4,779,340 | 10/1988 | Kihm et al. . |
| 4,894,792 | 1/1990 | Mitchell et al. . |
| 5,132,871 | 7/1992 | Densham et al. . |

(List continued on next page.)

FOREIGN PATENT DOCUMENTS

| 0426 414 A2 | 5/1991 | European Pat. Off. . |
| 0464 550 A2 | 1/1992 | European Pat. Off. . |
| 0606 111 A2 | 6/1994 | European Pat. Off. . |
| 0624 002 A2 | 11/1994 | European Pat. Off. . |
| 0 814 399 A1 | 12/1997 | European Pat. Off. . |
| 2 750 228 | 8/1998 | France . |
| WO 95/23368 WO | 8/1995 | WIPO . |
| 96/087732 A2 | 3/1996 | WIPO . |
| WO 96/27836 | 9/1996 | WIPO . |
| 60031510 | 10/1997 | WIPO . |
| WO 98/20404 A2 | 5/1998 | WIPO . |
| WO 98/20404 A3 | 5/1998 | WIPO . |

OTHER PUBLICATIONS

"Design of the ISDN PC Card", K. Kitamura, K. Higuchi, S. Nakano, T. Ueda, Singapore ICCS, 1994.
"PCMIA: Adapree Target Mobile Computing Market with Two New Host Adapters that Relieve Problem of System–to–System and Peripheral Connectivity", *EDGE: Work–Group Computing Regon*, Nov. 21, 1994.
"Design of the ISDN PC Card", K. Higucki, T. Kajlwara, K. Kitmura, S. Nakano, T. Ueda, 1994 (In Japanese).
Cardstation, DAK Series–PCMCIA Expansion Development Adapter Kit, User Manuel–Axonix Version 1.0 , Nov. 1994.
Cirrus Logic Intros Enhanced PCMCIA Host Adapter–Newsbytes, Ian Stokell, Nov. 10, 1993.
Board Vendors Respond with PCMCIA Cards, Expansion Modules—Electronic Engineering Times, Oct. 10, 1994.
Cardstation—Expanded Your Portable World, Axonix Advertixement, 2 pages.
The Universal Portable Multimedia Solution—Axonix Advertisment, 1 Page.
Cardstation Promedia™, Applications, Presentations, Training Sales, Games & Education—Axonix Advertisement, 1 Page.
Portable CD–ROM Players—Laptop Buyer's Guide and Handbook, vol. 13, No. 1, pp. 55 and 56.
CD–Station; Low Cost, High Performance Multimedia Solution for PCMCIA—Pacrim Advertisement, 1 Page.
"Design of the ISDN PC Card", Kimmura, Nov. 14, 1994, IEEE, pp. 1169, col. 1–2, 1170, col. 1, and 1171, col. 1–2.

*Primary Examiner*—Thomas C. Lee
*Assistant Examiner*—Abdelmoniem I. Elamin
*Attorney, Agent, or Firm*—Grant R. Clayton; Samuel Shipkovitz

[57] ABSTRACT

A system and method are provided for interconnecting computer peripherals with portable and desktop computers. More specifically, the present invention includes a system and method for simultaneously connecting multiple portable computer peripherals to a single portable computer interface slot, for connecting portable computer peripherals to a desktop computer, and for connecting a portable ZIP drive to a portable computer.

15 Claims, 3 Drawing Sheets

U.S. PATENT DOCUMENTS

| | | |
|---|---|---|
| 5,186,646 | 2/1993 | Pederson . |
| 5,187,645 | 2/1993 | Spalding et al. . |
| 5,191,653 | 3/1993 | Banks et al. . |
| 5,290,178 | 3/1994 | Ma . |
| 5,301,346 | 4/1994 | Notarianni et al. . |
| 5,304,334 | 4/1994 | Horiuchi . |
| 5,305,180 | 4/1994 | Mitchell et al. . |
| 5,311,397 | 5/1994 | Harshberger et al. . |
| 5,332,306 | 7/1994 | Babb et al. . |
| 5,402,518 | 3/1995 | Lowery . |
| 5,430,847 | 7/1995 | Bradley et al. . |
| 5,457,784 | 10/1995 | Wells et al. ............................. 395/829 |
| 5,459,637 | 10/1995 | Ma et al. . |
| 5,463,742 | 10/1995 | Kobayashi . |
| 5,471,587 | 11/1995 | Fernando . |
| 5,481,678 | 1/1996 | Kondo et al. . |
| 5,499,346 | 3/1996 | Amini et al. . |
| 5,514,859 | 5/1996 | Seigel . |
| 5,519,851 | 5/1996 | Bender et al. . |
| 5,530,620 | 6/1996 | Sangveraphunsiri . |
| 5,535,371 | 7/1996 | Stewart et al. . |
| 5,537,599 | 7/1996 | Tanaka . |
| 5,539,616 | 7/1996 | Kikinis . |
| 5,579,487 | 11/1996 | Meyerson et al. . |
| 5,579,528 | 11/1996 | Register . |
| 5,584,043 | 12/1996 | Burkart .................................. 395/882 |
| 5,590,336 | 12/1996 | Parry . |
| 5,596,169 | 1/1997 | Baker et al. . |
| 5,596,562 | 1/1997 | Chen . |
| 5,659,761 | 8/1997 | De Arras et al. . |
| 5,664,228 | 9/1997 | Mital ...................................... 395/882 |
| 5,668,654 | 9/1997 | Benjamin . |

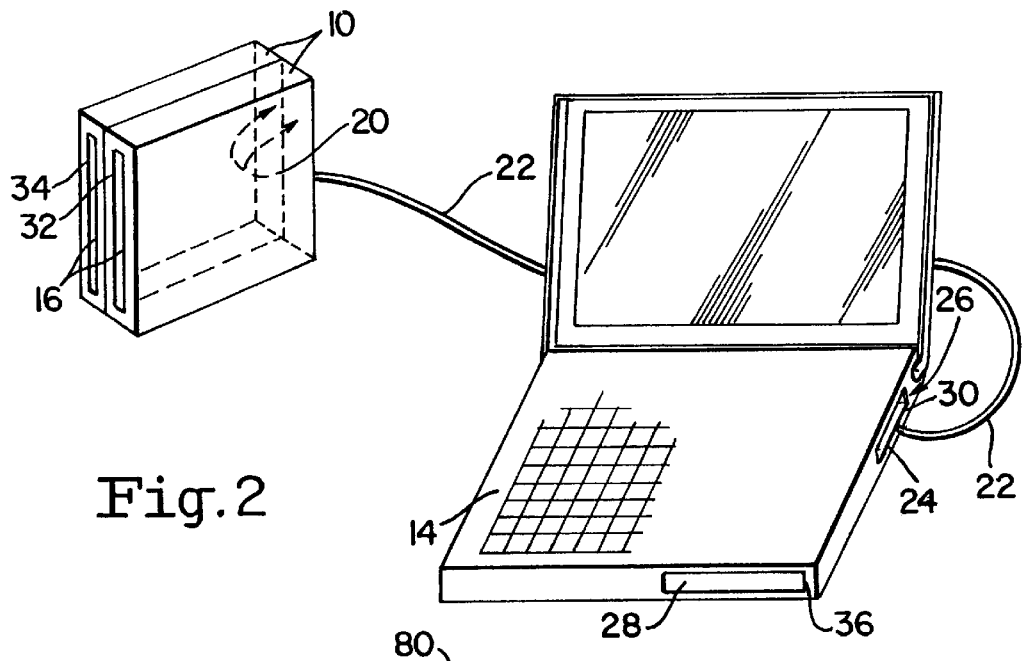
Fig.2
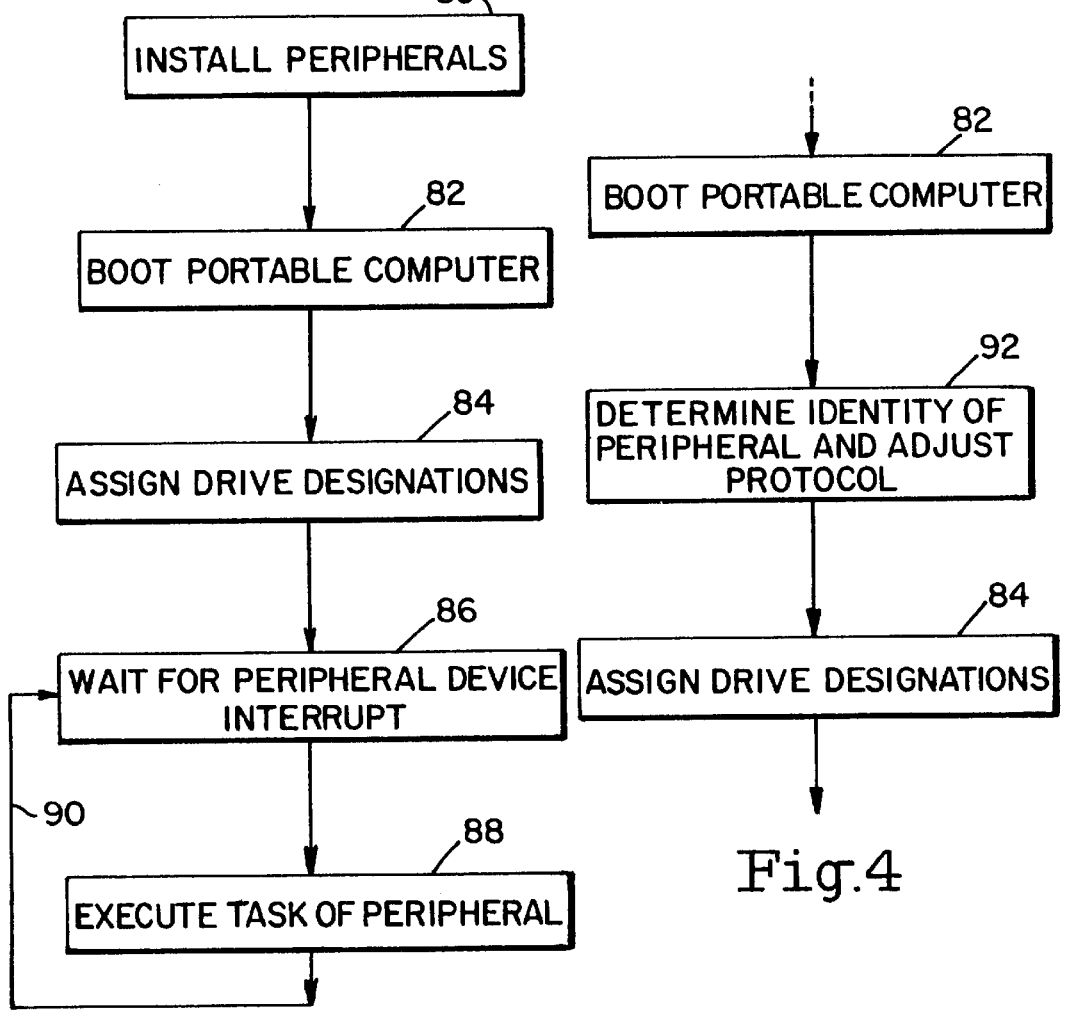
Fig.3
Fig.4

SYSTEM AND METHOD FOR INTERCONNECTION OF COMPUTER PERIPHERALS VIA MULTIPLE INTERFACES

BACKGROUND OF THE INVENTION

1. Field of the Invention

This invention pertains to a system and method for interconnecting computer peripherals and computers. More specifically, the present invention provides a system and method for simultaneously connecting multiple portable computer peripherals to a single portable computer interface slot, for connecting portable computer peripherals to a desktop computer, and for connecting a high density, portable, and removable drive to a portable computer.

2. State of the Art

The present invention generally encompasses interfacing computer peripherals with computers. To understand the benefits derived from the embodiments to be described herein, it is helpful to understand the existing interconnections and to see why they fail to provide the advantages and benefits of the preferred and alternative embodiments of the present invention. It is also beneficial to a reader to consider the following materials which are herein incorporated by reference. U.S. patent application Ser. No. 08/399,728 (now abandoned) filed on Mar. 07, 1995, and PCT patent application Ser. No. PCT/US96/03248 filed on Mar. 07, 1996.

The first improved interconnection of the present invention to be described pertains to portable computers. Portable computers are generally understood to include the family of computers known as laptops, notebooks and portables. They are known as portables because they are generally smaller units compared to desktop computers which can more easily be carried from place to place and used at remote locations, often away from plug-in power sources such as AC power outlets. The benefits of mobile computing can be substantial. However, it is often the case that the versatility of these portables is sacrificed for the sake of small size, lower power requirements, and generally any other considerations which make the computer portable. Therefore, peripheral components which are often a part of less easily portable desktop computer systems are not as easily integrated within a portable computer system.

Because space is limited within a chassis of a portable computer, and power constraints dictate that power drain must be kept to a minimum, most portable computers have only one bay which can be used to house only one of various peripheral devices at any given time. This bay is often referred to as a multi-function bay when more than one type of peripheral can be inserted therein to communicate with the host portable computer. A floppy drive is often the default peripheral of choice to be placed in the bay because it is used nearly universally for data transfer. However, a CD-ROM drive has also become an almost indispensable peripheral for computers today. Therefore, when a CD-ROM drive is needed, the floppy drive is removed and the CD-ROM drive is inserted in its place, or swapped.

A significant drawback of the single multi-functional bay portable computer described above is that only one peripheral device can be used at a time. Furthermore, it was also not mentioned that "hot-swapping", or the replacement of one peripheral device with another when the computer is operational, is typically not possible for floppy drives, CD-ROM drives and similar peripherals. Therefore, the portable computer has to be completely powered down before the swap can be made. When more than one peripheral component is needed or when the swapping of two peripherals must be executed more than once, the cycle of powering down, swapping, and then powering up again can become tedious and wasteful of time.

Therefore, it would be an advantage over the prior art to provide a portable computer which can be simultaneously coupled to more than one portable computer peripheral which can be swapped in and out, and thus take advantage of the ability to have more than one of the portable computer peripherals electrically coupled to the portable computer, but without having to swap them. These advantages include the ability to have portable computer peripherals communicate directly.

The next improved interconnection of the present invention to be described pertains less specifically to the portable computer, and more to the portable computer peripherals which are swapped in and out of the single multi-function bay. Specifically, consider the situation where a portable computer is purchased with some portable computer peripherals. Typically, these portable computer peripherals are the only peripherals which will communicate with the portable computer. Notwithstanding the various reasons for this occurrence such as proprietary connectors, pinouts or timing schemes, the result is that portable computer peripherals will often only communicate with the portable computers for which they were specifically designed. Now consider that the same user also has a desktop computer. It is often the case that the same peripherals needed for the portable computer are also needed for the desktop computer. Consequently, the user is forced to buy the same peripherals for the desktop computer that were already purchased for the portable computer. The result is needless expense to the user because of redundancy in functionality of peripherals.

It would be an advantage over the prior art to be able to use the portable computer peripherals with the desktop computer despite the proprietary nature common to the portable computer peripherals.

The last improved interconnection of the present invention to be described again pertains more specifically to a portable computer. The desire within the industry for an easily portable and high density, removable storage medium contributed significantly to the success of the ZIP drive. The ZIP drive is comprised of a drive unit which stores data to removable ZIP disks. Slightly thicker than the ubiquitous three and one half inch 1.44 Megabyte floppies in use today, they are nevertheless able to store about 100 Megabytes of data, or the storage capacity of roughly the equivalent of seventy 1.44 Megabyte floppies on a single removable ZIP disk. The ability to store a large quantity of data or much larger single files on a single removable storage medium is very advantageous. Consequently, desktop computers are beginning to install them as standard equipment which comes with a basic desktop computer system. However, portable computers have not been able to take advantage of removable ZIP drive capacity because of the interface requirements of the multi-function bay of the portable computer, and the size constraints therein.

Therefore, it would be another advantage over the prior art to incorporate a ZIP drive or other removable, high density storage medium into a portable computer to take advantage of inexpensive and removable mass storage capabilities.

OBJECTS AND SUMMARY OF THE INVENTION

It is an object of the present invention to provide a system and method for interconnecting computer peripherals and computer systems.

It is another object to provide a system and method for simultaneously connecting multiple portable computer peripherals to a single portable computer interface slot so that peripheral swapping is unnecessary.

It is still another object to provide a system and method for connecting any of a number of proprietary portable computer peripherals to a single computer interface slot.

It is yet another object to provide a system and method for connecting portable computer peripherals to a desktop computer so that these peripherals can be shared by both the portable computer and the desktop computer.

It is also an object to provide a system and method for connecting any of a number of proprietary portable computer peripherals to a desktop computer to reduce peripheral redundancy and thereby reduce the cost of peripheral systems to the user.

It is still another object to provide a system and method for connecting a drive using high density, portable and removable mass storage media to a portable computer so that the portable computer can take advantage of convenient and inexpensive mass storage.

It is yet another object to provide a system and method as described above which uses a ZIP drives with removable ZIP disks as the high density, portable and removable mass storage media.

In accordance with these and other objects of the present invention, the advantages of the invention will become more fully apparent from the description and claims which follow, or may be learned by the practice of the invention to be described hereinafter.

The present invention provides a system and method for accomplishing the objective of interconnecting computer peripherals with portable and desktop computers. In a first aspect of the invention, a single interface slot on a portable computer is electrically coupled to an interface port of an external docking bay comprised of a plurality of interface slots or ports. Portable computer peripherals are electrically coupled to the ports of the external docking bay. The portable computer is then able to access all of the peripheral devices in the external docking bay which are normally only accessible one at a time when electrically coupled to a multi-function port in a multi-function bay made for receiving a single portable computer peripheral in the portable computer.

In a related aspect of the present invention, the single interface slot to which the external docking bay is electrically coupled is not necessarily the dedicated multi-function port. In other words, a PC card slot (also known as a PCMCIA slot) might also be used to electrically couple the external docking bay to the portable computer.

Another related aspect of the present invention involves overcoming the proprietary characteristic of some interfaces between portable computer peripherals and the portable computer. In other words, the present invention can be used where a variety of different proprietary interfaces are will be encountered.

Another aspect of the present invention is to provide an external docking bay which can be electrically coupled to a hard drive which is incompatible with the IDE interface or some other standard interface which is normally used by the portable computer. This enables the external docking bay to act as an interface to the portable computer for devices which could not otherwise be coupled thereto.

Another aspect of the present invention is related to the advantageous capability of electrically coupling portable computer peripherals to a desktop computer or an expansion chassis. An internal bay is provided for insertion within a slot or port of the desktop computer. The internal bay is thereby electrically coupled to a communications bus within the desktop computer. The internal bay also provides a port which is compatible with an interface port of a portable computer peripheral. The desktop computer is thus able to interface with the portable computer peripherals as if they were inserted into the portable computer. The portable computer peripherals can still be swapped out of the desktop computer and into the portable computer when they are needed there.

Another aspect of the present invention is related to electrically coupling a specific desktop peripheral with a portable computer. Specifically, ZIP drives manufactured by Iomega are an increasingly popular removable, high density, mass storage device. However, no proprietary ZIP drives have been manufactured which will fit within the chassis of a portable computer. This is probably because a ZIP drive disk is significantly thicker than a compact disk (CD-ROM) or 1.44 Megabyte floppy. The present invention overcomes the challenge of electrically coupling a ZIP drive to a portable computer interface port such as a multi-function port within a multi-function bay.

Another aspect of the present invention is to provide a tape drive backup unit which is electrically coupled to the portable computer interface port within the multi-function bay.

These and other objects, features, advantages and alternative aspects of the present invention will become apparent to those skilled in the art from a consideration of the following detailed description taken in combination with the accompanying drawings.

DESCRIPTION OF THE DRAWINGS

FIG. 2 is an illustrative embodiment shown in perspective of two external docking bays shown in FIG. 1, now electrically coupled to a portable computer via a PC card (PCMCIA) slot.

FIG. 3 is a flow chart showing a preferred method of operation of the preferred embodiment of the present invention shown in FIG. 1.

FIG. 4 is a modification to the flow chart of FIG. 3 which explains how the preferred embodiment of the present invention compensates for proprietary communications.

DETAILED DESCRIPTION OF THE INVENTION

Reference will now be made to the drawings in which the various elements of one preferred embodiment of the present invention will be given numerical designations and in which the preferred embodiment of the invention will be discussed so as to enable one skilled in the art to make and use the invention.

Figure 1:
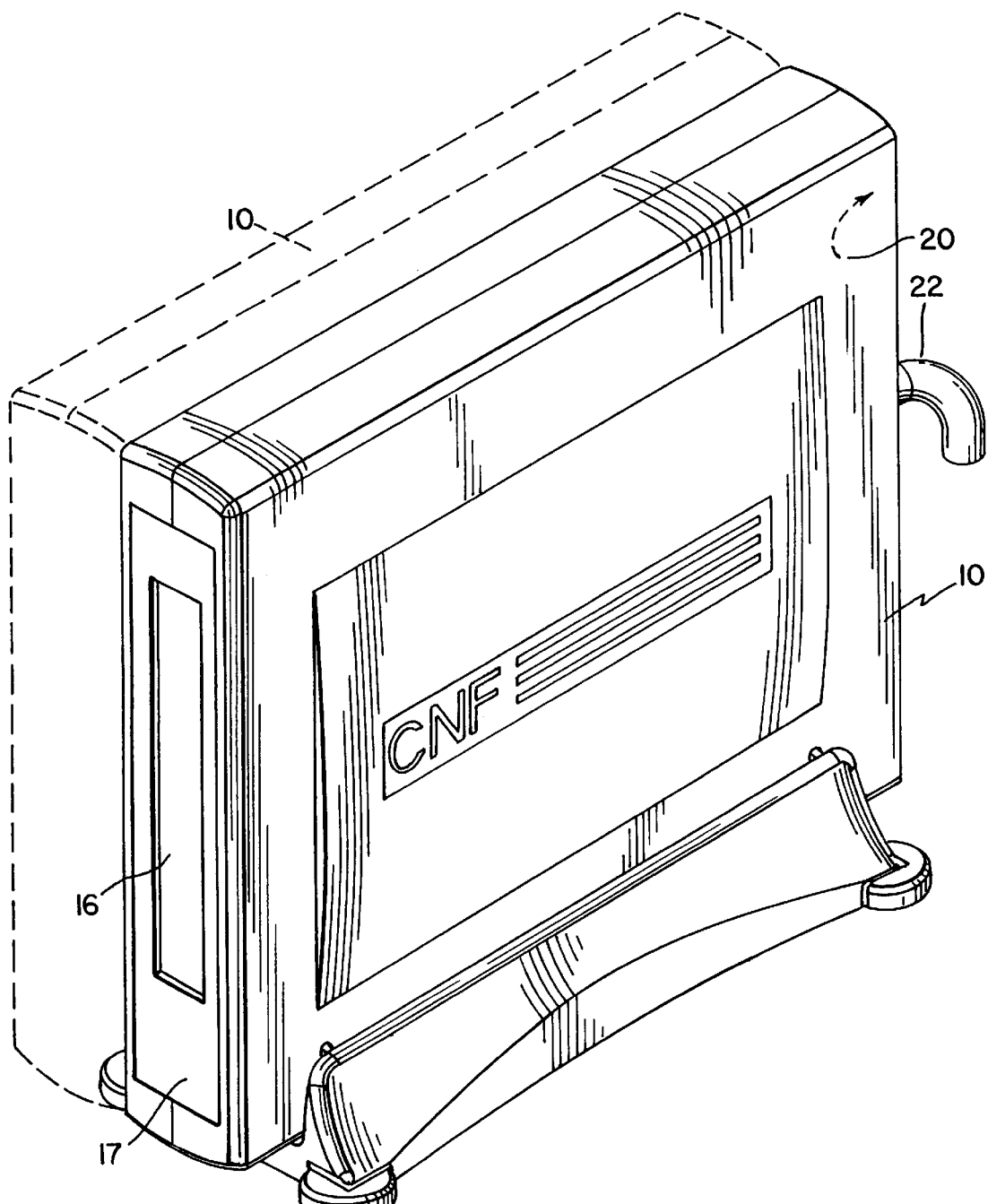
FIG. 1 is a perspective illustration of the external casing of an external docking bay shown in an upright position and made in accordance with the principles of a preferred embodiment of a first aspect of the present invention.

The present invention is illustrated in a preferred embodiment of the first aspect in FIG. 1. FIG. 1 shows an external docking bay 10. The external docking bay 10 pictured is designed to enable a single portable computer peripheral 12 to be electrically coupled to a portable computer 14 (see FIG. 2). In an exemplary illustration, the portable computer 14 is a notebook computer manufactured by such industry leaders in computer notebooks such as IBM, Compaq or Toshiba. The external docking bay 10 is comprised of an insertion end 16 having a bay door 17 where the portable computer peripheral 12 is inserted into the external docking bay 10. Within the external docking bay 10 at an opposing coupling end 18 is an interface port 20. The portable computer peripheral 12 is electrically coupled to the interface port 20 because the interface port 20 is constructed to be identical in physical dimensions and pinouts to the multi-function port in the multi-function bay 36 of the portable computer 14. The interface port 20 is electrically coupled to a cable 22 which is also electrically coupled to a coupling device 24 (see FIG. 2) for insertion into a portable computer 14. The coupling device 24 enables the external docking bay 10 to be electrically coupled to the portable computer 14 at a portable computer interface port 26 (see FIG. 2).

It should be noted that the external docking bay 10 is constructed to receive portable computer peripherals 12 which are designed to fit within a multi-function bay 36 of the portable computer 14 without modification. Therefore, the dimensions of the bay within the external docking bay 10 are the same as those of a multi-function bay 36 in the portable computer 14.

One skilled in the art will also appreciate that the external docking bay 10 shown in FIG. 1 is expandable beyond the single interface port 20 provided therein. Advantageously, a plurality of portable computer peripherals 12 can therefore be simultaneously coupled to the portable computer 14. One of the benefits of this configuration is that instead of having to swap portable computer peripherals 12 by shutting down the computer, replacing the current portable computer peripheral 12 with the desired portable computer peripheral 12, and then rebooting, all portable computer peripherals 12 are available without swapping. However, a factor which has not been mentioned is the possible requirement that the external docking bay 10 might have to provide for management of the use of data communication lines (not shown) within the cable 22. This management is similar to bus arbitration techniques, as known to those skilled in the art, which determine which devices are able to use bus lines and when.

FIG. 2 provides an illustration of an exemplary situation of the embodiment described in FIG. 1. When a user has a floppy drive unit 28 presently installed in a multi-function bay 36 of the portable computer 14, this embodiment enables simultaneous use of another portable computer peripheral 12, specifically a CD-ROM drive unit 32 which is inserted into the external docking bay 10. Normally, the user has no option but to remove the floppy drive unit 28 and install the CD-ROM drive unit 32 in the multi-function bay 36. But in this embodiment of the present invention, the external docking bay 10 is simultaneously coupled via a specific portable computer interface port 26. In this embodiment, a PC card slot 30 is used on the portable computer 14 as the interface between the portable computer 14 and the external docking bay 10. Those skilled in the art will appreciate that any appropriate port can be used as the portable computer interface port 26. However, the PC card (PCMCIA) port 30 is an almost universally accepted standard which facilitates implementation of this embodiment of the present invention.

An added benefit of using the PC card slot as the interface for the external docking bay 10 in this preferred embodiment is that the external docking bay need only accommodate one portable computer peripheral 12 if only two peripherals are needed. This is because the multi-function bay can still be used with a portable computer peripheral 12.

The external docking bay 10 is shown as having room for two portable computer peripherals 12 (see also FIG. 1). The CD-ROM drive unit 32 is inserted into the external docking bay 10 at the insertion end 16 until it is electrically coupled to an associated interface port 20 within.

For illustration purposes, the remaining interface port 20 within external docking bay 10 is shown having a tape drive backup unit 34 installed therein. However, those skilled in the art will appreciate that the tape drive backup unit 34 did not have to be installed. In other words, the interface ports 20 within the external docking bay 10 do not have to be filled for proper operation of the portable computer 14. One or both of the interface ports 20 can be empty when the portable computer 14 is booted. However, it should be obvious to those skilled in the art that to be able to use portable computer peripherals 12 other than the one installed in the multi-function bay 36, it is necessary to install the portable computer peripherals 12 in the external docking bay 10 before booting the portable computer 14.

Assuming that the CD-ROM drive unit 32 and the drive backup unit 34 were installed in the external docking bay 10 before booting the portable computer 14, all three portable computer peripherals 12 are now accessible by the portable computer 14. For example, data stored on a CD in the CD-ROM drive unit 32 can advantageously be copied directly to a floppy disk in the floppy drive unit 28. Likewise, data stored in an internal hard disk 38 within the portable computer 14 can advantageously be copied directly to the tape drive backup unit 34 in the external docking bay 10. A portable computer running a multi-tasking operating system can even execute the data transfer and copying processes described above simultaneously.

FIG. 3 is a flow chart of the general method of operation of the preferred embodiment illustrated in FIG. 1. It should be remembered that this illustration is only a preferred embodiment and can therefore be implemented using other methods within the scope of understanding of those skilled in the art after a presentation of the nature of the present invention as taught herein.

FIG. 3 begins with step 80 where all desired portable computer peripherals 12 are installed in an external docking bay 10 having an appropriate number of bays. It should be mentioned that although it was explained earlier that none or as a few as one of the external docking bays 10 need to be filled for the portable computer 14 to operate, the same is true for the multi-function bay 36 of the portable computer 14. The multi-function bay 36 can be empty and the operation of the portable computer 14 will not be affected.

Step 82 requires that the portable computer 14 be rebooted. The portable computer peripherals 12 are now all simultaneously available to the user. In the preferred embodiment, the operating system and/or a hardware component such as a bus controller of the portable computer 14 assigns a unique drive designation to each of the portable computer peripherals 12 in step 84 so that they can be accessed accordingly. For illustration purposes only, the portable computer peripheral 12 in the multi-function bay could always be assigned the designation "C:", the first peripheral in the external docking bay 10 could always be assigned the designation "D:", and so forth until the last portable computer peripheral 12 in the external docking bay 10 is assigned a drive designation. If there is no portable computer peripheral 12 in the multi-function bay 36, then the first portable computer peripheral 12 in the external docking bay 10 will receive the drive designation "C:" and so on as before.

Step 86 in the preferred embodiment encompasses the concept of deciding which of the portable computer peripherals 12 the portable computer 14 is going to communicate with, and when. For example, in the preferred embodiment, an interrupt-type method of communication is chosen. When a portable computer peripheral 12 requires communication with the portable computer 14 or another portable computer peripheral 12, an interrupt can be set which designates the appropriate portable computer peripheral 12 as requiring attention for the portable computer 14.

Step 88 shows that in the preferred embodiment, once the portable computer 14 has determined that one of the portable computer peripherals 14 requires attention, a predetermined amount of time is devoted to responding to the portable computer peripheral's 12 task. The predetermined amount of time might require repeated interruptions of the task while other functions of the portable computer 14 are carried out. Those skilled in the art will appreciate that the function described can be executed in many different ways. However, the portable computer 14 and its operating system can be assumed to already possess the ability to control a plurality of portable computer peripherals 12 already. This should be obvious in that the functionality added is an extension of the portable computer's 14 ability to share bus time and perform other task for an internal hard drive and floppy drive unit 28 which are already typically installed in the portable computer 14.

Line 90 is also included to indicate that the portable computer 14 is always looping back to check on a status of other portable computer peripherals 12, if any, after a task is completed, or even during a task if the portable computer 14 and operating system enable such an interruption. It will be appreciated by those skilled in the art that peripheral device status checking is accomplished by numerous methods, and are considered to be within the scope and teachings of the present invention.

In an alternative embodiment, the impetus for communication between the portable computer peripherals 12 and the portable computer 14 in step 84 can be replaced with a polling scheme. The portable computer 14 will actively poll all portable computer peripherals in a rotating fashion, basically asking each peripheral if it requires communication. If not, the portable computer 14 queries a next portable computer peripheral 12 in an endless loop. The loop is only interrupted when a portable computer peripheral 12 requires attention, and then perhaps only in small segments of time until the portable computer peripheral 12 no longer requires attention from the portable computer 14 when its task is complete.

FIG. 4 shows an additional step 92 which is inserted between the steps 82 and 84 in an alternative embodiment of the present invention. In this embodiment, the portable computer 14 makes a determination upon bootup about which type of portable computer peripherals 12 are electrically coupled to the external docking bay 10. While the interface port 20 may have the same arrangement of pins for the many different models or computer manufacturers of portable computers 14, the signals on the pins may differ significantly. Therefore, an alternative embodiment of the present invention is the capability to determine at an appropriate time what type of portable computer peripheral 12 the portable computer 14 will be communicating with. In this embodiment, the external docking bay 10 can then make the appropriate adjustments to compensate for changes in signal assignments on pins of various portable computer peripherals 12. It is also envisioned that some portable computer peripherals 12 use the same pinout configurations, but that signal timing is altered. Therefore, the present invention is prepared to compensate for these timing differences or pinout variations by an appropriate method known to those skilled in the art. For example, a signal which must be generated on a particular line for a certain length of time, as required by the portable computer 14, can be extended by the external docking bay 10 if the portable computer peripheral 12 otherwise drops the signal too early. Likewise, the external docking bay 10 can also cut signal short in the same manner.

Figure 5:
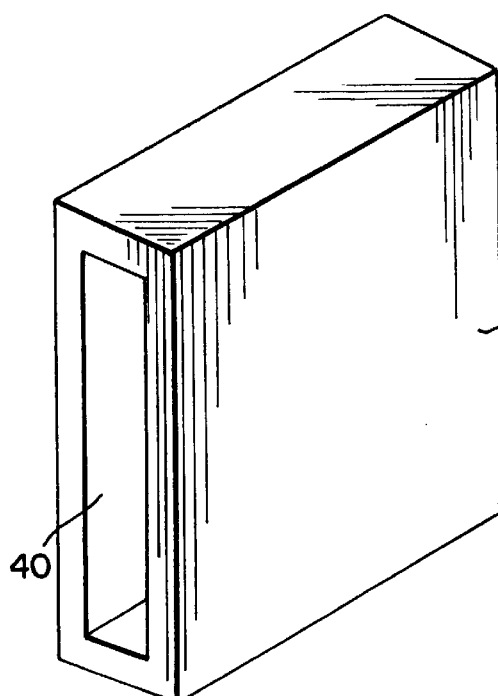
FIG. 5 is an illustration in perspective of an external hard drive unit which is electrically coupled to the external docking bay 10 so as to be used by the portable computer with which it cannot typically communicate.

FIG. 5 shows that an external hard drive unit 90 is electrically coupled to the external docking bay 10. There are some hard drives which do not conform to typical bus interfaces because they are much larger than a typical hard drive. The external docking bay 10 can be used as an interface between the bus of the portable computer 14 and the hard drive 90. It should be appreciated by those skilled in the art that another advantage of the present invention therefore is the ability to function as an interface to the portable computer 14 for peripherals which are not normally compatible.

Figure 6:
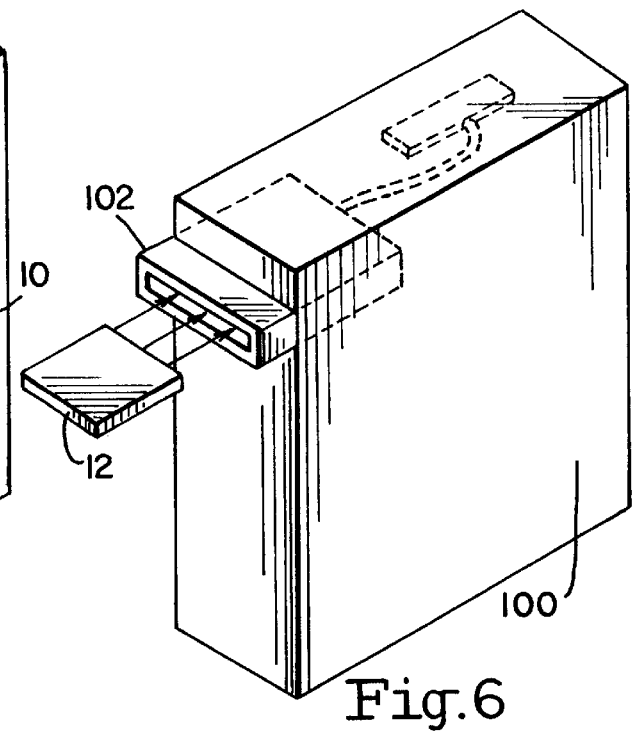
FIG. 6 illustrates another alternative embodiment of the present invention which shows that portable computer peripherals can also be used on a desktop computer.

FIG. 6 illustrates another alternative embodiment of the present invention which shows that portable computer peripherals 12 can also be used on a desktop computer 100, and thereby avoid duplicate but otherwise necessary and expensive proprietary purchases to outfit both a portable computer 14 and the desktop computer 100 with the same peripherals. It should be realized that this embodiment has application for use in an expansion chassis (not shown) as well.

FIG. 6 shows that an internal bay 102 is electrically coupled to an internal bus slot 104 of the desktop computer 100 by any appropriate means such as direct connection or via a cable, and shown here in a tower or mini-tower configuration. The bus used by the desktop 100 can be any of those commonly used today such as ISA, EISA, Microchannel, VESA, and PCI and which are known to those skilled in the art. Similarly, parallel, serial, SCSI or FireWire peripheral connection might also be used to couple the internal bay 102 to the desktop computer 100. The internal bay 102 provides an interface between the typically proprietary signals being used by the portable computer peripheral 12, and the industry standardized bus signals. It is envisioned that an internal bay 102 would be purchased for using the portable computer peripherals 12 of only a particular computer portable 14 manufacturer. All of the portable computer peripherals 12 would then be able to function on the desktop computer 100 from within the internal bay 102.

One benefit that is immediately realized from this alternative embodiment is the advantage of using the same portable computer peripherals 12 with the desktop computer 100 and the portable computer 14.

Figure 7:
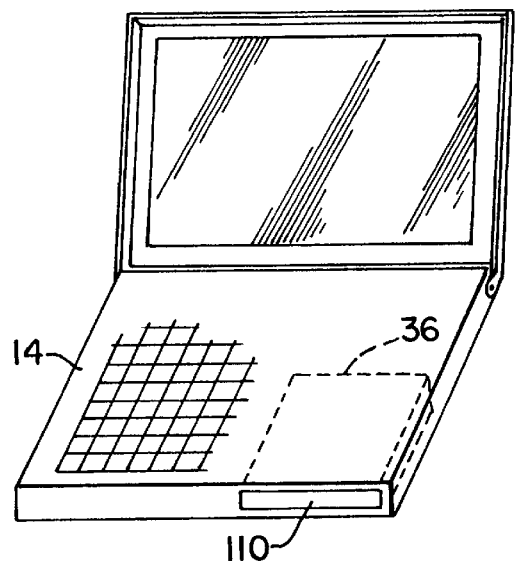
FIG. 7 illustrates another alternative embodiment of the present invention which enables a drive utilizing a portable, high density, removable storage medium to be constructed to fit with the multi-function bay 36 and therefore be utilized as other portable computer peripherals.

Next, FIG. 7 is provided to illustrate that the present invention also teaches installation of a drive 110 which utilizes an easily portable, high density, removable storage medium. An example of such a drive and storage medium are the ZIP drive as disclosed previously. The ZIP drive 110 has been constructed such that it is able to fit within the multi-function bay 36 of the present invention. Likewise, the ZIP drive 110 can be used in the external docking bay 10 and the internal bay 102 of previous embodiments.

Figure 8:
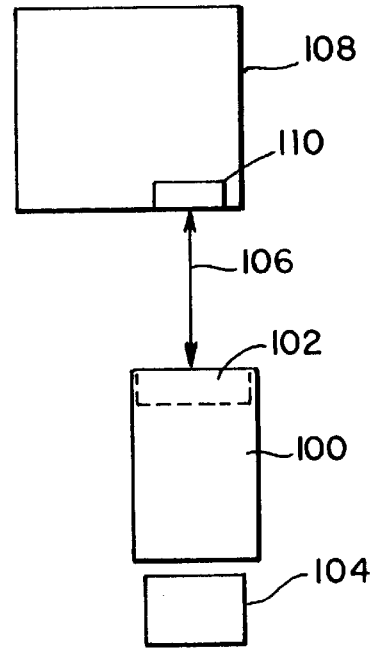
FIG. 8 is a block diagram showing another alternative embodiment of the present invention which accomodates one or more interfaces which are available in the industry.

In accordance with another aspect of the present invention, the present invention provides that one or more industry standard interfaces can be accommodated. Represented diagrammatically in FIG. 8 is a notebook computer 108 as is known in the industry or which may become available in the future. The notebook computer 110 can include one or more industry standard interfaces such as those known as PCI, PCMCIA, CardBus, and/or FireWire (IEEE 1394). The hardware and/or software necessary to implement these industry standards is represented by the interface 110 in FIG. 8.

The signals which are conveyed by the interface 110 are communicated by a link 106 which may be a hardwired link or a wireless link, in accordance with which industry standard interface 110 adheres. Represented in FIG. 8 is an adaptable docking bay 100 which preferably substantially includes the features and structures described in connection with docking bay 10 described earlier. The adaptable docking bay 100 also includes an adaptable interface which can accommodate any one, or in some preferred embodiments, more than one, industry standard interface such as ISA, PCI, PCMCIA, CardBus, and/or FireWire so that reliable and efficient communication between the adaptable docking bay 100 and the notebook computer 108 can occur. More information on the FireWire standard can be obtained from the IEEE 1394 standard and the documents which have been promulgated by the IEEE under the 1394 standard are hereby incorporated herein by reference.

As explained above, the docking bay 10 receives one of a number of different portable computer peripherals. In the case of the adaptable docking bay 100, a portable computer peripheral 104 is received into the docking bay 100. The portable computer peripheral 104 may be any number of different types of devices, such CD-ROM drives, disk drives, and many other different types of devices. Such devices may require different industry standard interface. Thus, the portable computer peripheral 104 may require an interface such as an IDE interface, an ATAPI interface, FireWire interface, SCSI interface, or another interface.

Represented in FIG. 8 is an interface adapter represented at 102. The interface adaptor 102 includes the hardware and/or software which is necessary to allow data and instructions to be transferred between two dissimilar standards. For example, the interface adapter 102 allows communication to efficiently occur between one or more of the following standards, all of which are well known in the industry: PCCard, PCI, Parallel, IEEE 488, Serial, RS-232, PS/2, PCMCIA, CardBus, FireWire, IDE, ATAPI, or some proprietary interface which one or more particular manufacturers have adopted or may adopt in the future. Thus, it will be appreciated that if the portable computer peripheral 104 requires an IDE/ATAPI interface, the interface adaptor 102 can preferably provide adaptable communication in accordance with the FireWire interface, if that is the standard with which the notebook computer 108 is equipped. It is to be understood that the present invention can be used with many different types of computing devices, not just the notebook computer 108 represented in FIG. 8.

The preferred embodiment and the alternative embodiments of the present invention teach a system and method for interconnecting computer peripherals with both a desktop computer and a portable computer, where the portable computer peripherals 12 can be used on both computers 14, 100. Furthermore, they also teach that a portable computer can be coupled to more than portable computer peripheral 12 even though the portable computer has a single multi-function bay, thus eliminating swapping of portable computer peripherals. The present invention is also able to accommodate various proprietary protocols.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for electrically coupling a computer peripheral device to a computer, said system comprising:

a computer having an interface compliant with a first interface standard, the computer having a housing and being a battery operated computer having at least one multi-function peripheral bay within the housing which can interchangeably receive only one of a plurality of different peripherals, the first interface standard being compatible with the PCMCIA standard implemented in a PCMCIA compatible card slot;

a peripheral bay comprising means for making physical and electrical connection with one of the computer peripherals, the computer peripheral being compliant with a second interface standard, the peripheral bay being located outside of the computer housing;

means for operatively connecting the PCMCIA card slot with the peripheral bay including a PCMCIA compliant connecter for insertion into the PCMCIA compatible card slot; and means for translating communications between the computer in accordance with the first interface standard and the peripheral nested in the peripheral bay in compliance with the second interface standard such that an operative link between the computer and the computer peripheral is established when a computer peripheral is nested in the peripheral bay.

2. The system as defined in claim 1 wherein the second interface standard is selected from the group comprising: PCCard, PCI, Parallel, IEEE 488, Serial, RS-232, PS/2, PCMCIA, CardBus, FireWire, IDE, ATAPI interfaces.

3. A system as defined in claim 1 wherein the peripheral is one selected from the group consisting of: CDROM drive; floppy drive and ZIP drive.

4. A system as defined in claim 1 wherein the means for operatively connecting comprises a cable and a PCMCIA card attached to the PCMCIA compliant connecter.

5. A system as defined in claim 1 wherein the peripheral bay comprises:

a housing;

an opening in the housing which receives the peripheral device into the housing, including a lip provided on the peripheral device enclosure.

6. A system as defined in claim 1 further comprising a second peripheral bay operatively connected to the computing device.

7. A system as defined in claim 1 wherein the means for operatively connecting comprises a fifty conductor connector and a cable.

8. A system for electrically coupling a peripheral device to a computing device, the computing device having an interface compatible with the PCMCIA interface standard, said system comprising:

a first peripheral bay comprising means for making physical and electrical connection with the peripheral device, the peripheral device being compliant with a second interface standard; and means for translating communications between the computer interface which is compatible the PCMCIA interface standard and the first peripheral bay in compliance with the second interface standard, the second interface standard being one selected from those compatible with a rotating media storage device, such that an operative link between the computer and the computer peripheral is established when the computer peripheral is nested in the first peripheral bay.

9. The system as defined in claim 8 wherein the first peripheral bay is positioned external to the computing device.

10. The system as defined in claim 8 wherein the first peripheral bay is positioned internally in the computing device.

11. The system as defined in claim 9 wherein the first peripheral bay comprises:

a housing;

an opening in the housing which receives the peripheral device into the housing, including a lip provided on the peripheral device enclosure.

12. The system as defined in claim 9 further comprising a second peripheral bay operatively connected to the computing device.

13. The system as defined in claim 9 wherein the means for making physical and electrical connection with a computer peripheral comprises a fifty conductor connector and a cable.

14. The system as defined in claim 9 wherein the computer peripheral comprises an enclosure having first, second, third, and fourth sides, the enclosure having a substantially rectangular shape having a lip extending from the first side thereof.

15. The system as defined in claim 9 wherein the second interface standard is selected from the group consisting of: PCCard, PCI, Parallel, IEEE 488, Serial, RS-232, PS/2, CardBus, IDE, ATAPI interfaces.

* * * * *